United States Patent
Lim et al.

(10) Patent No.: US 9,407,930 B2
(45) Date of Patent: *Aug. 2, 2016

(54) METHOD AND APPARATUS FOR PROCESSING A VIDEO SIGNAL

(71) Applicant: LG ELECTRONICS INC., Seoul (KR)

(72) Inventors: Jaehyun Lim, Seoul (KR); Jungsun Kim, Seoul (KR); Seungwook Park, Seoul (KR); Jaewon Sung, Seoul (KR); Byeongmoon Jeon, Seoul (KR); Joonyoung Park, Seoul (KR); Yongjoon Jeon, Seoul (KR); Younghee Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/690,660

(22) Filed: Apr. 20, 2015

(65) Prior Publication Data

US 2015/0229958 A1 Aug. 13, 2015

Related U.S. Application Data

(63) Continuation of application No. 13/685,116, filed on Nov. 26, 2012, now Pat. No. 9,042,450, which is a continuation of application No. PCT/KR2011/003876, filed on May 26, 2011.

(Continued)

(51) Int. Cl.
*H04N 7/32* (2006.01)
*H04N 19/56* (2014.01)
(Continued)

(52) U.S. Cl.
CPC ......... *H04N 19/56* (2014.11); *H04N 19/00569* (2013.01); *H04N 19/176* (2014.11); *H04N 19/50* (2014.11); *H04N 19/513* (2014.11); *H04N 19/573* (2014.11)

(58) Field of Classification Search
None
See application file for complete search history.

(56) References Cited

U.S. PATENT DOCUMENTS

| 7,466,774 B2 | 12/2008 | Boyce |
| 8,902,983 B2 | 12/2014 | Jeon |

(Continued)

FOREIGN PATENT DOCUMENTS

| CN | 1450812 A | 10/2003 |
| CN | 1744719 A | 3/2006 |

(Continued)

OTHER PUBLICATIONS

International Search Report dated Feb. 6, 2012 for Application No. PCT/KR2011/003876 with English Translation, 4 pages.

(Continued)

*Primary Examiner* — Kate Luo
(74) *Attorney, Agent, or Firm* — Fish & Richardson P.C.

(57) ABSTRACT

The present invention relates to a method and apparatus for encoding or decoding a video signal. According to the present invention, a plurality of reference units for image prediction of the current unit is acquired and combined to obtain a unit prediction value, thereby improving the accuracy of image prediction. More particularly, the present invention relates to a method for inducing a variety of reference units using a motion vector prediction value or a motion vector which is used in conventional inter-prediction, and also relates to a method which combines the reference units so as to obtain the prediction value for the current unit. In addition, the present invention relates to a method which involves acquiring a plurality of reference units for a merging mode, and combining the reference units so as to perform image prediction.

18 Claims, 19 Drawing Sheets

Related U.S. Application Data

(60) Provisional application No. 61/348,260, filed on May 26, 2010, provisional application No. 61/354,687, filed on Jun. 14, 2010, provisional application No. 61/371,727, filed on Aug. 8, 2010, provisional application No. 61/375,280, filed on Aug. 20, 2010.

(51) Int. Cl.
  *H04N 19/50* (2014.01)
  *H04N 19/573* (2014.01)
  *H04N 19/176* (2014.01)
  *H04N 19/513* (2014.01)

(56) References Cited

U.S. PATENT DOCUMENTS

| | | |
|---|---|---|
| 8,902,984 B2 | 12/2014 | Jeon |
| 2005/0281329 A1 | 12/2005 | Chin |
| 2008/0049845 A1 | 2/2008 | Liu |
| 2009/0129465 A1 | 5/2009 | Lai |
| 2009/0154563 A1 | 6/2009 | Hong |
| 2009/0279608 A1 | 11/2009 | Jeon |
| 2010/0142614 A1 | 6/2010 | Pandit |
| 2013/0336400 A1 | 12/2013 | Jeon |
| 2013/0336401 A1 | 12/2013 | Jeon |

FOREIGN PATENT DOCUMENTS

| | | |
|---|---|---|
| EP | 1 359 769 A1 | 11/2003 |
| KR | 10-0824616 B1 | 4/2008 |
| WO | WO 2008/133910 A2 | 11/2008 |

OTHER PUBLICATIONS

Yang Weiyan et al, "A new generation of video compression coding standard-H-264/AVC", partial English Translation.

H264 Motion vector prediction in the decoder hardware implementation scheme, partial English Translation.

U.S. Office Action dated Aug. 4, 2014 for U.S. Appl. No. 13/772,114, 11 Pages.

FIG. 14

```
prediction_unit(x0, y0, currPredUnitSize ) {
  intra_prediction_flag
    if( intra_prediction_flag ) {
      intra_split_flag
        for( i = 0; i < ( intra_split_flag ? 4 : 1 ); i++ )
          intra_prediction_mode
    } else {
      inter_partitioning_idc
        for( i = 0; i < NumInterPartitions; i++ ) {
          if( NumMergeCandidates > 0 ) {
            merge_flag                                        ← 1402
              if( merge_flag && NumMergeCandidates > 1 )
                merge_left_flag                               ← 1404
          }
          if( !merge_flag ) {
            inter_pred_idc
              if( inter_pred_idc != Pred_L1 ) {
                if( num_ref_idx_l0_active_minus1 > 0 )
                  ref_idx_l0 [ i ]
                  mvd_l0 [ i ][ 0 ]
                  mvd_l1 [ i ][ 1 ]
              }
```

FIG. 16

```
prediction_unit(x0, y0, currPredUnitSize ) {
  intra_prediction_flag
    if( intra_prediction_flag ) {
      intra_split_flag
        for( i = 0; i < ( intra_split_flag ? 4 : 1 ); i++ )
          intra_prediction_mode
    } else {
      inter_partitioning_idc
        for( i= 0; i < NumInterPartitions; i++ ) {
          if( NumMergeCandidates > 0 ) {
            merge_flag
              if( merge_flag && NumMergeCandidates > 1 )
                merge_mode                                    ← 1604
          }
          if( !merge_flag ) {
            inter_pred_idc
              if( inter_pred_idc != Pred_L1 ) {
                if( num_ref_idx_l0_active_minus1 > 0 )
                  ref_idx_l0 [ i ]
                mvd_l0 [ i ] [ 0 ]
                mvd_l1 [ i ] [ 1 ]
              }
``` motion_info(A) != motion_info(B)

METHOD AND APPARATUS FOR PROCESSING A VIDEO SIGNAL

CROSS REFERENCE TO RELATED APPLICATIONS

This application is a continuation of U.S. application Ser. No. 13/685,116, filed Nov. 26, 2012, now allowed, which is a continuation of International Patent Application No. PCT/KR2011/003876, filed on May 26, 2011, which claims the benefit of U.S. Provisional Applications No. 61/348,260, filed May 26, 2010, 61/354,687, filed Jun. 14, 2010, 61/371,727, filed Aug. 8, 2010 and 61/375,280, filed Aug. 20, 2010, all of which are incorporated by reference.

TECHNICAL FIELD

The present invention relates to a method and apparatus for processing a video signal, and more particularly, to a method and apparatus for encoding or decoding a video signal.

BACKGROUND ART

Compression encoding refers to a series of signal processing technologies for transmitting digitized information through a communication line or storing such information in a storage medium in an appropriate form. Some examples of targets of compression encoding are voice, images, text, etc., and particularly, a technology for performing compression encoding of a moving image is called video image compression. Compression encoding of a video signal is performed by removing surplus information in consideration of spatial correlation, temporal correlation, probabilistic correlation, etc. However, recently, as various media and data transmission media have been developed, there is an increasing need for a highly efficient method and apparatus for processing a video signal.

DISCLOSURE

Technical Problem

In the process of processing a video signal, inter-screen prediction obtains a unit prediction value through a reference unit indicated by the motion vector of the current unit, and performs decoding of the current unit using the same. Here, as the accuracy of the unit prediction value gets higher, the information transmitted for decoding may be reduced.

Here, if the current unit obtains the unit prediction value of the current unit through the limited reference unit, image prediction accuracy may be lowered and prediction efficiency may be lowered according to the characteristics of the image. However, if the amount of information of the reference unit is increased for more accurate image prediction, the amount of information transmitted for the prediction may be increased, which is a problem.

Therefore, there is a need for an efficient method for processing a video signal which may minimize the amount of information transmitted while increasing the image prediction accuracy of the current unit in which decoding is performed.

Technical Solution

The present invention has been designed to solve the above problems, and an object of the present invention is to increase accuracy of image prediction by obtaining a multiple of reference units for image prediction of a current unit and obtaining a unit prediction value by combining the obtained reference units.

In particular, an object of the present invention is to provide a method for inducing various reference units using a motion vector prediction value or motion vector used in conventional inter-screen prediction (inter-prediction), and provide a method for combining the reference units to obtain the prediction value of the current unit.

Further, an object of the present invention is to provide a method for performing image prediction using a multiple of reference units even in a merging mode of inter-prediction.

In addition, an object of the present invention is to provide a method for storing motion information of a unit, which has performed a merging mode, using a multiple of reference units, for decoding of the next unit.

Advantageous Effects

According to a video signal processing method of the present invention, the prediction value of the current unit is obtained by combining a multiple of reference units, and decoding is performed using the obtained prediction values, thereby increasing the accuracy of image prediction. As such, the amount of information transmitted for restoration of video signals may be reduced.

Further, according to embodiments of the present invention, various reference units are induced using a motion vector prediction value or motion vector used in conventional inter-prediction, and thus the amount of information transmitted for addition of a reference unit may be reduced, thereby allowing efficient image processing.

Further, the unit prediction value of the current unit may be obtained by adaptively selecting a reference unit among various reference unit candidates, thereby significantly increasing the efficiency of image prediction.

DESCRIPTION OF DRAWINGS

FIG. 14 illustrates an embodiment for obtaining information on whether to be merged with one of the two neighbor units of FIG. 13 through a flag value.

FIG. 16 illustrates an embodiment for obtaining a combination of neighbor units used in multiple-prediction merger through an index value.

BEST MODE

Figure 1:
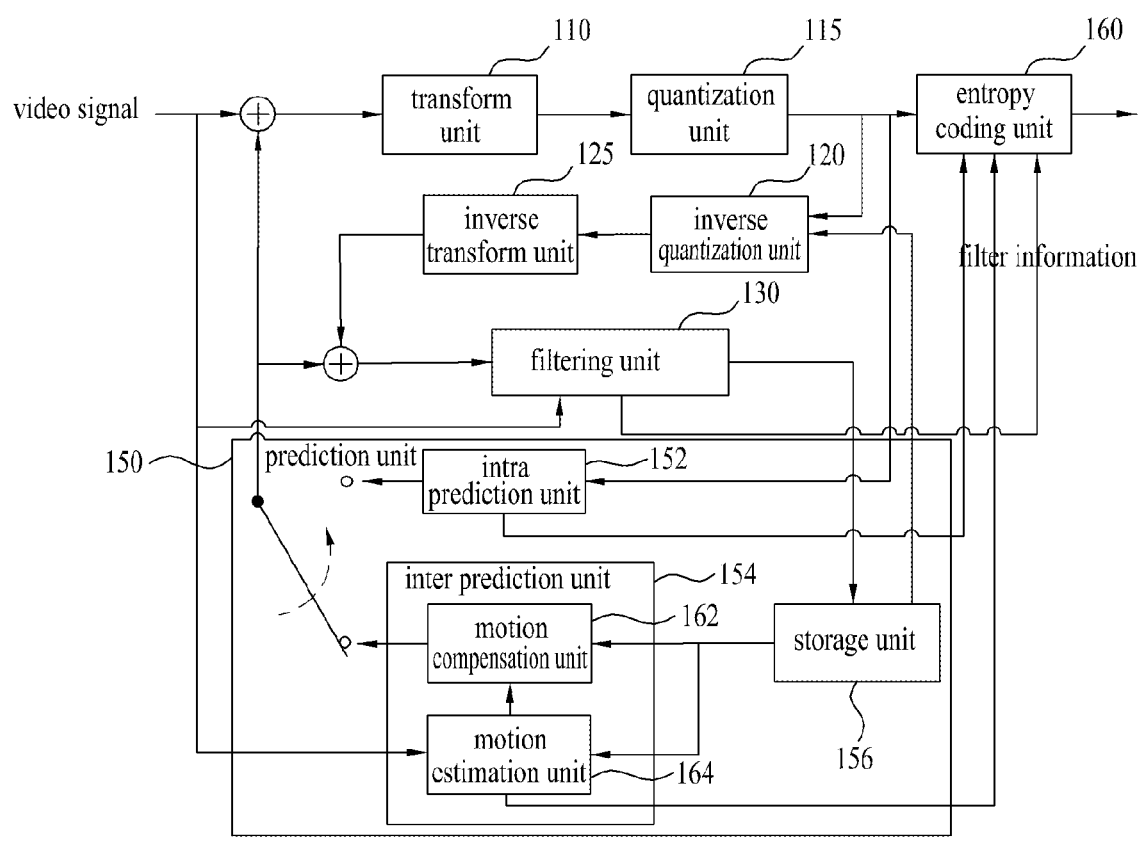
FIG. 1 is a schematic block diagram of a video signal encoding apparatus according to an exemplary embodiment of the present invention.

An object of the present invention can be achieved by providing a method for processing a video signal, including determining whether a current unit performs a multi-hypothesis inter-screen prediction (inter prediction), obtaining a multiple of reference units for the inter prediction in the case in which the current unit performs the multi-hypothesis inter prediction, obtaining a prediction value of the current unit by combining the obtained multiple of reference units, and restoring a pixel value of the current unit using the prediction value of the current unit, wherein the multi-hypothesis inter prediction combines the multiple of reference units and uses the combined result as the prediction value of the current unit.

Here, obtaining the multiple of reference units obtains the reference units through a combination of reference units obtained by a motion vector prediction value and a motion vector value for L0 prediction direction of the current unit, and a motion vector prediction value and a motion vector value for L1 prediction direction of the current unit.

Further, obtaining the multiple of reference units obtains the reference units through a combination of reference units obtained by a motion vector value of the current unit and a scaled motion vector value of the motion vector.

In another aspect of the present invention, provided herein is a method for processing a video signal, including obtaining a merge flag indicating whether a current unit uses a merge mode, obtaining an index value indicating a combination of neighbor units to be used in a merger in the case in which the merge flag indicates that the current unit is in a merge mode and the number of valid candidate units is larger than 1, obtaining a multiple of reference units to be used in a multi-hypothesis merger using motion information of neighbor units selected on the basis of the index value, obtaining a prediction value of the current unit by combining the obtained multiple of reference units, and restoring a pixel value of the current unit using a prediction value of the current unit, wherein the multi-hypothesis merger obtains each reference unit using motion information of a multiple of neighbor units, combines the reference units, and uses the combined result as a prediction value of the current unit.

Here, obtaining the prediction value of the current unit averages image values of the reference units, and obtains the averaged value as the prediction value of the current unit.

Further, obtaining the prediction value of the current unit gives each of image values of the reference units weight in inverse proportion to a temporal distance between the reference units and the current frame, linearly combines the image values, and obtains the combined result as the prediction value of the current unit.

MODE FOR INVENTION

Reference will now be made in detail to the preferred embodiments of the present invention, examples of which are illustrated in the accompanying drawings. First of all, terminology or terms used in this specification and claims are not construed as limited to the general or dictionary meanings thereof and should be construed as having meanings and concepts in accordance with the technical idea of the present invention based on the principle that an inventor is able to appropriately define concepts of the terminology to describe the inventor's invention as best possible. The embodiment disclosed in this disclosure and configurations shown in the accompanying drawings are just one preferred embodiment and do not represent all technical ideas of the present invention. Therefore, it is understood that the present invention covers the modifications and variations of this invention provided they come within the scope of the appended claims and their equivalents at the time this application is filed.

The following terminology in the present invention can be construed based on the following criteria and other unexplained terminology can be construed according to the following purposes. First of all, it is understood that the concept of "coding" in the present invention can be construed as either encoding or decoding in case. Further, in this disclosure, "information" generally includes values, parameters, coefficients, elements and the like and meaning thereof can be construed as different occasionally, and thus the present invention is not limited thereto. Further, in this disclosure, "unit" means a basic unit of image processing or a specific location of an image, and may also be expressed as "block", "partition" or "region", etc. In the present specification, the concept of "unit" may include all of a coding unit, a prediction unit, and a transform unit.

FIG. 1 is a schematic block diagram of a video signal encoding apparatus according to an exemplary embodiment of the present invention. Referring to FIG. 1, a video signal encoding apparatus 100 according to the present invention may include a transform unit 110, a quantization unit 115, an inverse-quantization unit 120, an inverse transform unit 125, a filtering unit 130, a prediction unit 150 and an entropy coding unit 160.

The transform unit 110 transforms a pixel value for an input video signal and then obtains a transform coefficient value. For instance, one of DCT (discrete cosine transform), wavelet transform and the like may be used. In particular, discrete cosine transform may be performed by dividing the input video signal by a block unit. The coding efficiency may be changed according to the distribution and features of values within the transform region at the time of transform.

The quantization unit 115 quantizes the transform coefficient value output from the transform unit 110. The inverse-quantization unit 120 inverse-quantizes the transform coefficient value and the inverse transform unit 125 reconstructs an original pixel value using the inverse-quantized transform coefficient value.

The filtering unit 130 performs a filtering operation for quality improvement of a reconstructed picture. For instance, the filtering unit 130 may include a deblocking filter, an adaptive loop filter and the like. The filtered images may be output or stored in the storage unit 156 to be used as a reference image.

In order to enhance coding efficiency, an image signal is not coded as itself, but a method of predicting an image using an already coded area and obtaining a reconstructed image by adding a residual value between the original image and the predicted image to the predicted image is used. The intra prediction unit 152 performs intra-image prediction within the current image, and the inter prediction unit 152 predicts the current image using the reference image stored in the storage unit 156. The intra prediction unit 152 performs intra prediction from the regions reconstructed within the current image, and transmits the intra coding information to the entropy coding unit 160. The inter-prediction unit 154 may include a motion compensation unit 162 and a motion estimation unit 164. The motion estimation unit 164 obtains a motion vector of a current region by referring to a restored specific region. The motion estimation unit 164 allows the location information of the reference region (reference frame, motion vector, etc.), etc. to be transmitted to the entropy coding unit 160 so as to be included in the bit stream. The motion compensation unit 162 performs inter motion compensation using the transmitted motion vector value in the motion compensation unit 162.

The entropy coding unit 160 generates a video signal bitstream by performing entropy coding on a quantized transform coefficient value, intra-picture coding information, inter-picture coding information, reference block information input from the inter-prediction unit 154 and the like. In this case, the entropy coding unit 160 may be able to use a variable length coding (VLC) scheme and an arithmetic coding scheme. The variable length coding (VLC) scheme transforms input symbols into contiguous codeword. A length of the codeword is variable. For instance, frequently generated symbols may be represented as a short codeword, whereas non-frequently generated symbols may be represented as a long codeword. A context-based adaptive variable length coding (CAVLC) scheme may be usable as a variable length coding scheme. The arithmetic coding scheme transforms contiguous data symbols into a single prime number. The arithmetic coding scheme may obtain an optimal prime bit required for representing each symbol. Context-based adaptive binary arithmetic code (CABAC) may be used as the arithmetic coding scheme.

Figure 2:
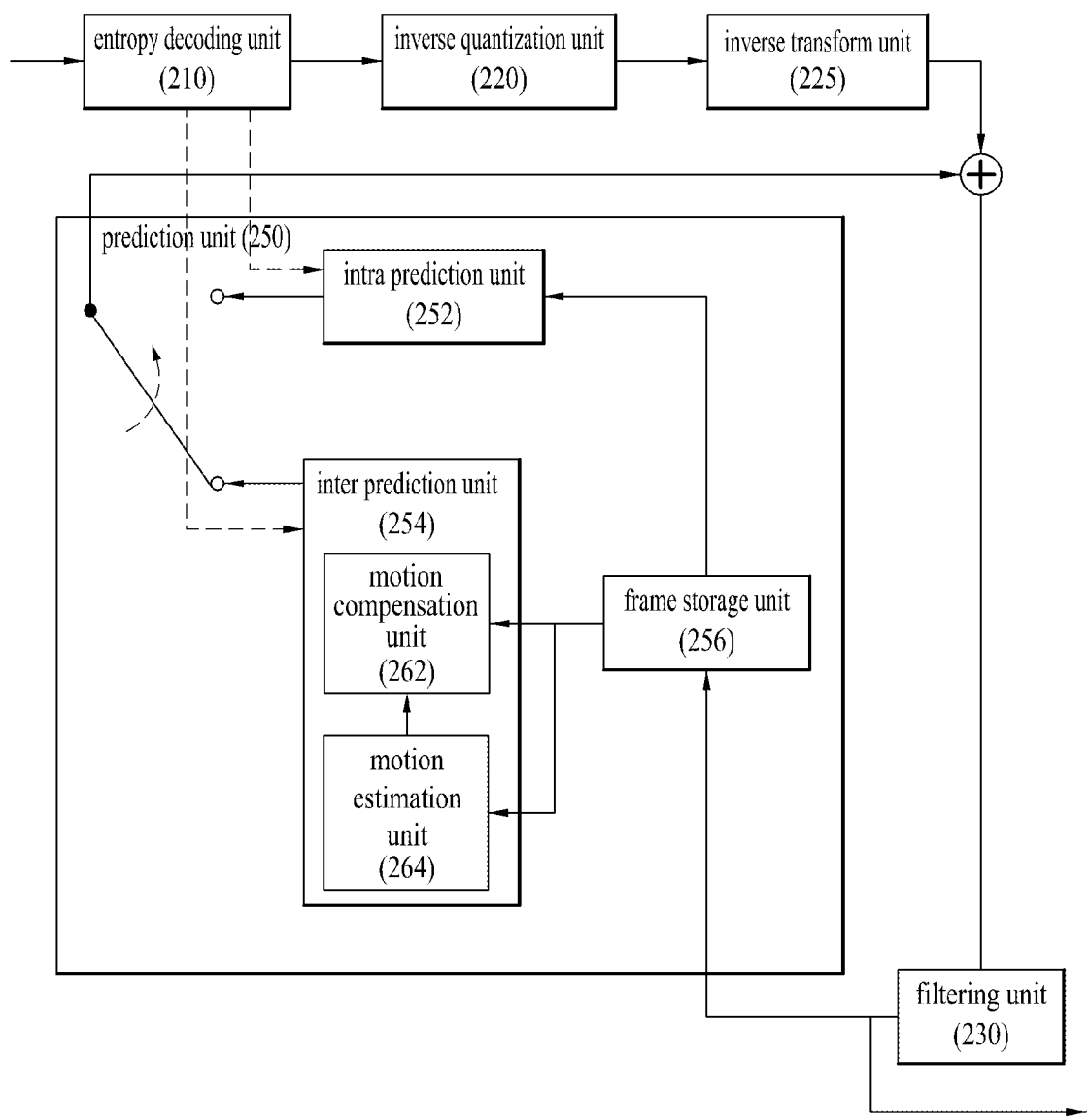
FIG. 2 is a schematic block diagram of a video signal decoding apparatus according to an exemplary embodiment of the present invention.

FIG. 2 is a schematic block diagram of a video signal decoding apparatus according to an exemplary embodiment of the present invention. Referring to FIG. 2, a video signal decoding apparatus 200 according to one embodiment of the present invention may include an entropy decoding unit 210, a inverse-quantization unit 220, an inverse transform unit 225, a filtering unit 230 and a prediction unit 250.

The entropy decoding unit 210 entropy-decodes a video signal bitstream and then extracts a transform coefficient of each macroblock, motion vector information and the like. The inverse-quantization unit 220 inverse-quantizes an entropy-decoded transform coefficient, and the inverse transform unit 225 reconstructs an original pixel value using the inverse-quantized transform coefficient.

Meanwhile, the filtering unit 230 improves image quality by filtering a picture. In this case, a deblocking filter for reducing block distortion, an adaptive loop filter for eliminating distortion of a whole picture and the like may be further included in the filtering unit. The filtered picture may be output or saved in a frame storage unit 256 to be used as a reference picture for a current frame.

Further, the prediction unit 250 of the present invention includes an intra prediction unit 252 and an inter prediction unit 252, and reconstructs a prediction image using information such as an encoding type decoded through the above mentioned entropy decoding unit 210, a transform coefficient about each region, a motion vector, etc.

In this regard, the intra prediction unit 252 performs intra prediction from the sample decoded within the current image.

The inter prediction unit 254 estimates the motion vector using the reference image stored in the frame storage unit 256, and generates a prediction image. The inter prediction unit 254 may include a motion compensation unit 262 and a motion estimation unit 264. The motion estimation unit 264 obtains a motion vector, which shows a relation between the current block and the reference block of the reference frame used in coding, and transmits the motion vector to the motion compensation unit 262.

The restored video frame is generated by adding a prediction value output from the intra prediction unit 252 or inter prediction unit 254, and the pixel value output from the inverse transform unit 225.

Figure 4:
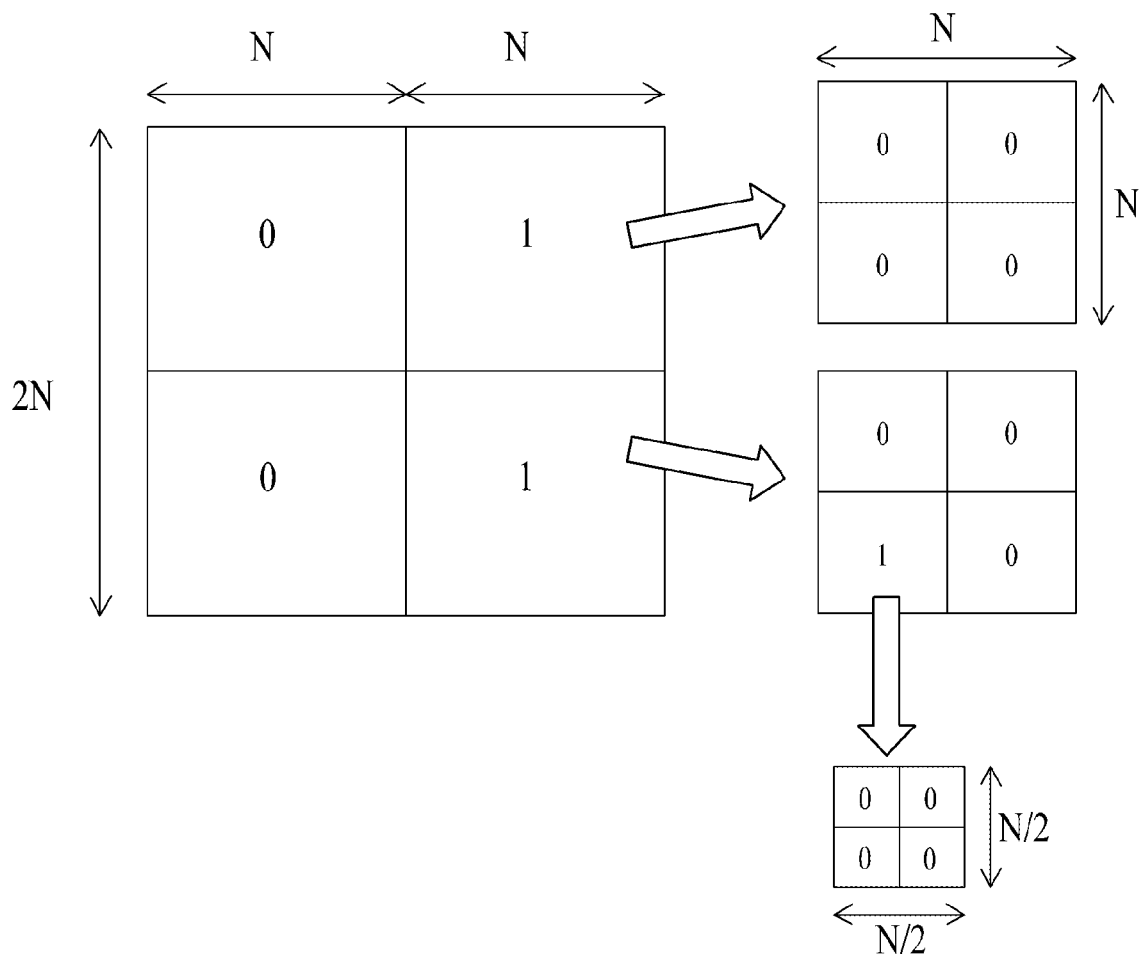
FIG. 4 illustrates a method for hierarchically representing a division structure of FIG. 3.
Figure 5:
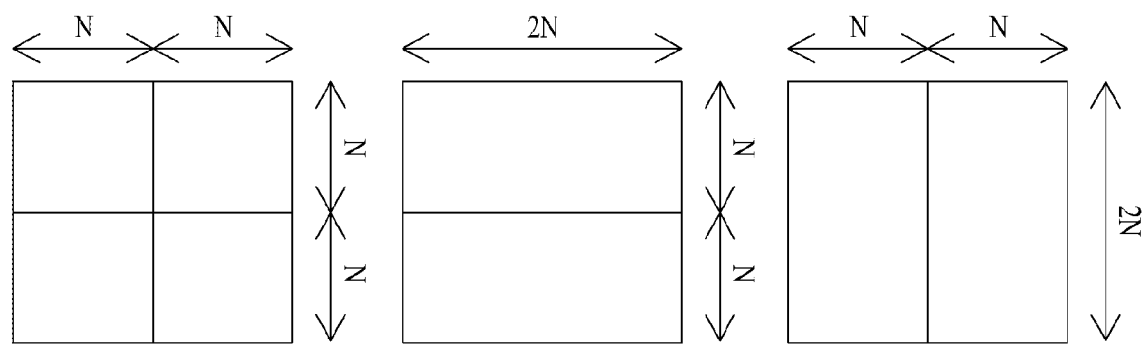
FIG. 5 illustrates a form of division into various sub-prediction units in a prediction unit according to an exemplary embodiment of the present invention.

Hereinafter, in the operation of the encoding apparatus and the decoding apparatus, a method of dividing the coding unit and the prediction unit, etc. will be described with reference to FIGS. 3 to 5.

A coding unit refers to a basic unit for processing an image in a process such as intra/inter prediction, transform, quantization and/or entropy coding, etc. in a process of processing an above described video signal. The size of the coding unit used in coding one image is not fixed. The coding unit may have a quadrilateral form, and one coding unit may be divided into several coding units.

Figure 3:
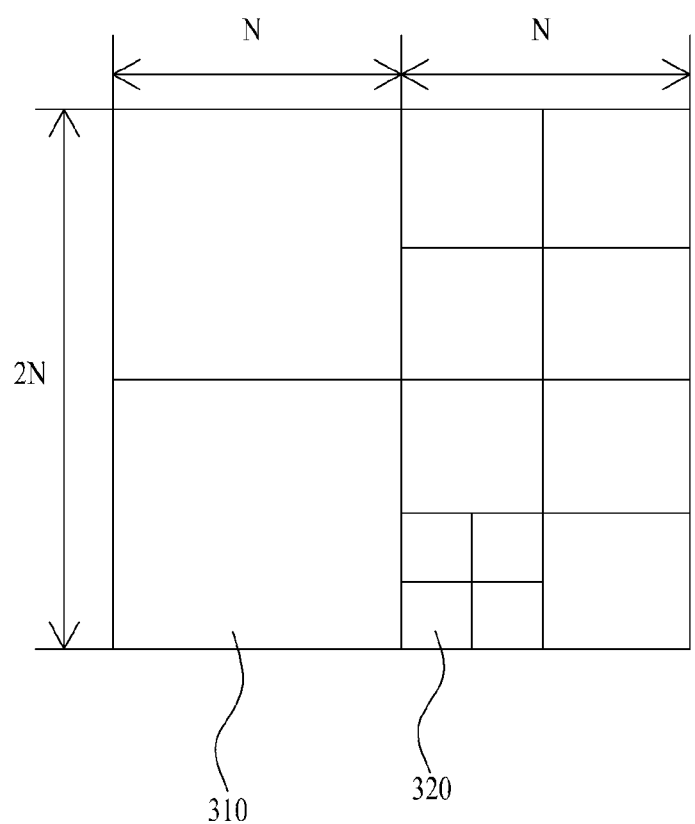
FIG. 3 illustrates an example of dividing a coding unit according to an exemplary embodiment of the present invention.

FIG. 3 illustrates an example of dividing a coding unit according to an exemplary embodiment of the present invention. For example, one coding unit having a size of 2N×2N may be divided into four coding units having a size of N×N. Such a division of a coding unit may be recursively performed, and it is not necessary for all coding units to be divided in the same form. However, for convenience in the coding and processing process, there may be a limitation on the maximum size 310 and the minimum size 320 of the coding unit.

For one coding unit, information indicating whether the coding unit is divided may be stored. For example, it is assumed that, as shown in FIG. 3, one coding unit may be divided into four square-shaped coding units. FIG. 4 illustrates a method for hierarchically representing a division structure of a coding unit illustrated FIG. 3 using 0 and 1. With respect to the information indicating whether the coding unit is divided, in the case in which the unit is divided, "1" may be allocated, and in the case in which the unit is not divided, "0" may be allocated. As illustrated in FIG. 4, if the flag value indicating whether the coding unit is to be divided is 1, the coding unit corresponding to the node is divided into four coding units, and if the flag value is 0, the unit is not divided any more, and the processing procedure for the coding unit may be performed.

The coding unit is not necessarily divided into four square-shaped regions. In such a case, the code for a predetermined division scheme may be mapped with the division information. For example, if the information value is 1, the coding unit may be divided into two horizontal rectangular sub coding units, if the information value is 2, the coding unit may be divided into two vertical sub coding units, if the information value is 3, the coding unit may be divided into four square-shaped sub coding units. Such methods are merely exemplary, and the present invention is not limited thereto.

The structure of the above described coding unit may be represented using a recursive tree structure. That is, using one picture or the maximum size coding unit as the root, the coding unit, which is divided into other coding units, has child nodes equal in number to the number of divided coding units. Therefore, the coding unit, which is not divided any more, becomes a leaf node. Assuming that only a square-shaped division is possible for one coding unit, one coding unit may be divided into a maximum of four other coding units, and thus the tree indicating the coding unit may be of a quadtree form.

In the encoder, the optimal coding unit size is selected in consideration of the attributes (e.g., resolution) of a video image or the coding efficiency, and the information thereabout or the information for inducing the same may be included in the bitstream. For example, the size of the maximum coding unit and the maximum depth of the tree may be defined. In the case of a square-shaped division, the height and width of the coding unit become half the height and width of the coding unit of the parent node, and thus the minimum coding unit size may be obtained using the above information. In contrast, the minimum coding unit size and the maximum depth of the tree are defined in advance, and the maximum coding unit size may be induced using the defined information. Since the unit size is changed in a form of a multiple of 2 in the square-shaped division, the size of the actual coding unit is represented as a log value having 2 as the base, thereby enhancing transmission efficiency.

In decoding, the information indicating whether the current coding unit has been divided may be obtained. If such information is set to be obtained (transmitted) under certain conditions, efficiency may be enhanced. For example, the condition, in which the current coding unit may be divided, is the case in which the result of adding the current coding unit size to the current location is smaller than the size of the picture (image), and the current unit size is larger than the preset minimum coding unit size, and thus information indicating whether the unit has been divided may be obtained only in such a case.

In the case in which the information indicates that the coding unit has been divided, the size of the coding unit to be divided becomes half the current coding unit, and the coding unit is divided into four square-shaped coding units on the basis of the current processing location. The same process may be repeated for each of the divided coding units.

The picture prediction (motion compensation) for coding is performed for the coding unit (i.e., leaf node of the coding unit tree), which is not divided any more. The basic unit, which performs such prediction, is called a prediction unit or a prediction block. The prediction unit may be divided in various manners, and may be divided into sub-prediction units of a symmetric form such as a square, a rectangle, etc., an asymmetric form or a geometric form. For example, one prediction unit may not be divided (2N×2N), and may be divided into sub-prediction units of a size of an N×N, 2N×N, N×2N, etc. as shown in FIG. 5. Further, the possible division form of the prediction unit may be different defined in the intra coding unit and the inter coding unit. For example, in the intra coding unit, only division of a 2N×2N or N×N form is possible, and in the inter coding unit, division of N×N, 2N×N, N×2N or 2N×2N may be possible. Here, the information on whether the prediction unit has been divided or information on which form the unit has been divided in may be included in the bit stream. Further, such information may be induced from other information.

Hereinafter, the term "unit" used in the present specification may be used as a term for substituting the prediction unit or sub-prediction unit which is the basic unit for performing prediction. However, the present invention is not limited thereto, and may be understood as a concept including the coding unit.

In order to restore the current unit in which decoding is performed, the current picture (image) including the current unit or the decoded portion of other pictures may be utilized. The picture (slice) for using the current picture in restoration, that is, performing only intra prediction, is called an intra picture or I picture (slice), the picture for using a maximum of one motion vector and reference index to predict each unit is called a predictive picture or P picture, and the picture for using a maximum of two motion vectors and reference indexes is called a bi-predictive picture or B picture.

The intra prediction unit performs an intra prediction which predicts a pixel value of a subject unit from the restored regions within the current picture. For example, the pixel value of the current unit may be predicted from the encoded pixels of the units located in the upper, left, upper left and/or upper right sides on the basis of the current unit.

The intra mode may be broadly divided into a vertical, horizontal, DC, angular mode, etc. depending on the direction of the reference region where the reference pixels used in the prediction of the pixel values are located, and the prediction scheme. The vertical mode uses the value in a vertically adjacent region of the subject unit as the prediction value of the current unit, and the horizontal mode uses the value in a horizontally adjacent region as the prediction value. In DC mode, the average value of the reference regions is used as the prediction value. Further, an angular mode is a case in which the reference region is located in a random direction, and the direction may be indicated by the angle between the current pixel and the reference pixel. For the convenience, a predetermined angle and a prediction mode number may be used, and the number of angles used may be changed according to the size of the subject unit.

Some specific modes may be defined for such various prediction methods. The prediction mode may be transmitted as the value indicating the mode, but a method of predicting the prediction mode value of the current unit may be used to enhance transmission efficiency. At this time, the prediction mode of the current unit may be obtained in the decoder with the information using whether the prediction value for the prediction mode is used, and the difference with the actual value.

Further, in the inter prediction unit, inter prediction, which predicts the pixel value of the subject unit, is performed using information of restored pictures rather than the current picture. Here, the picture, which is used in prediction, is called a reference picture. Which reference region is used in predicting the current unit in the process of inter prediction may be indicated using the index indicating the reference picture including the reference region and the motion vector information, etc.

Some examples of inter prediction are forward prediction, backward prediction and bi-directional prediction. Forward prediction is prediction using one reference picture displayed (or output) temporally before the current picture, and the backward prediction is prediction using one reference picture displayed (or output) temporally after the current picture. To this end, one set of motion information (e.g., a motion vector and reference picture index) may be necessary. In bidirectional prediction, a maximum of 2 reference regions may be used, and these two reference regions may exist in the same reference picture or may exist in different pictures. That is, in the bidirectional prediction, a maximum of two sets of motion information (e.g., a motion vector and reference picture index) may be used, and two motion vectors may have the same reference picture index or different reference picture indexes. Here, the reference pictures may be displayed (or output) temporally both before and after the current picture.

The motion information of the current unit may include the motion vector information and the reference picture index. The motion vector information may include the motion vector, motion vector prediction (mvp) or motion vector difference (mvd), and may mean index information which specifies the motion vector prediction. The motion vector difference means a difference between the motion vector and the motion vector prediction.

The reference unit of the current unit may be obtained using the motion vector and the reference picture index. The reference unit exists in the reference picture having the reference picture index. Further, the pixel value or interpolated value of the unit, which is specified by the motion vector, may be used as the predictor of the current unit. That is, motion compensation, which predicts the image of the current unit using the previously decoded picture, is performed using the motion information.

Further, in addition to the current picture, the reference picture list may be configured by pictures used for inter prediction. B picture requires two reference picture lists, and each of the lists is called reference picture list 0 (or L0) and reference picture list 1 (or L1).

In order to reduce transmission related with the motion vector, a method of obtaining the motion vector prediction (mvp) using the motion information of the previously coded units and transmitting only the motion vector difference (mvd) thereabout may be used. In the decoder, motion vector prediction is calculated using the motion information of other decoded units, and the motion vector value for the current unit is obtained using the transmitted difference. In motion vector prediction, various motion vector candidate values are obtained using the motion information of already coded units, and a motion vector competition, which obtains one of the obtained values as the motion vector prediction, may be used.

Motion vector candidates used in such motion vector competition may include the motion vector of a spatial neighbor unit or a temporal neighbor unit. The spatial neighbor unit refers to units adjacent to the current unit in the same picture as that of the current unit (see FIG. 6), and a temporal neighbor unit refers to a unit which exists in a location corresponding to the current unit in a picture other than the current unit (see FIG. 7).

Figure 6:
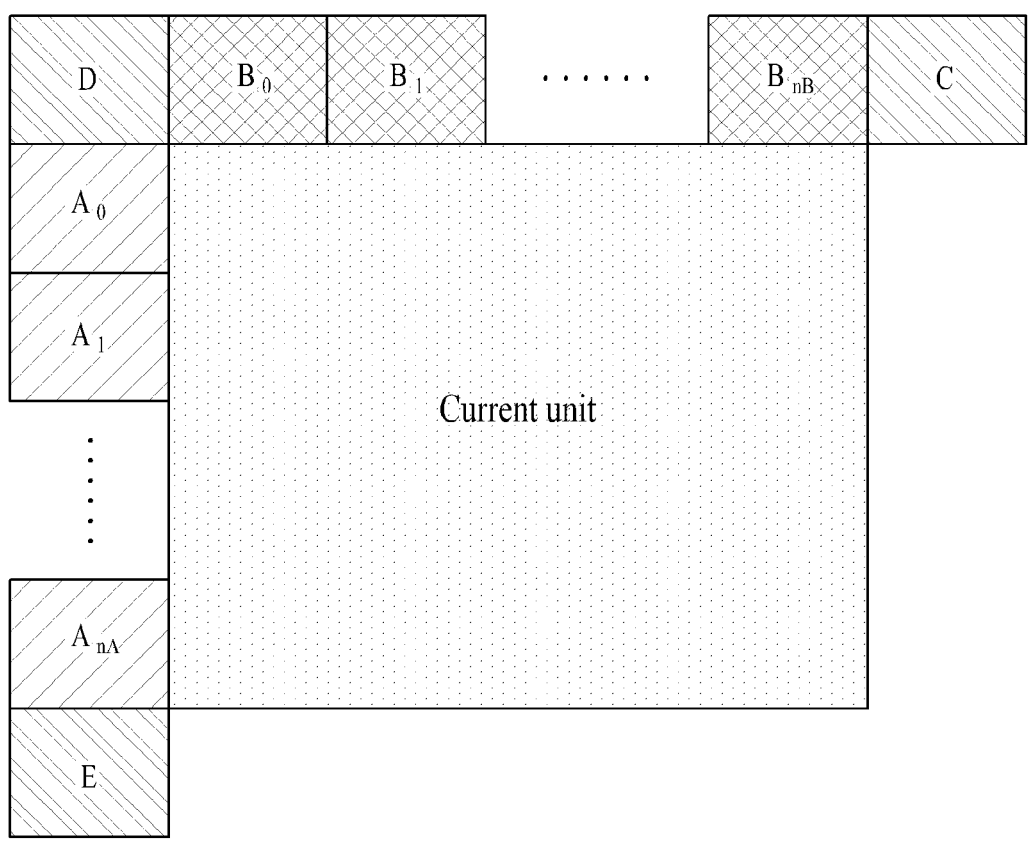
FIG. 6 illustrates a spatial neighbor unit of the current unit.
Figure 7:
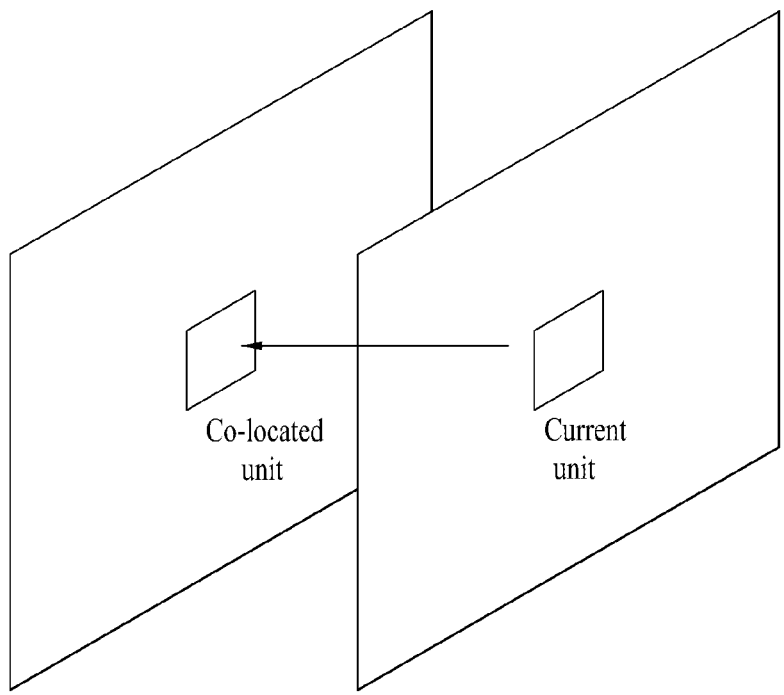
FIG. 7 illustrates a temporal neighbor unit of the current unit.

For example, referring to FIG. 6, the motion vectors of the spatial neighbor unit include motion vector a' of the unit selected from the left group, which is a set of left neighbor units $(A_0, A_1, \ldots, A_{nA})$ of the current unit, motion vector b' of the unit selected from the upper group, which is a set of upper neighbor units $(B_0, B_1, \ldots, B_{nB})$, and motion vector c' of the unit selected from the corner group, which is a set of diagonal adjacent units (C, D, E) of the current unit. Further, the median (a', b', c') of the motion vectors a', b' and c' may be induced, and the median may also be included in the motion vector candidates.

Likewise, the motion vector prediction may be obtained from the motion vector candidates including the motion vectors of spatial neighbor units and temporal neighbor units of the current unit, and the motion vector value for the current unit may be obtained by adding the transmitted difference. Here, in the case in which the current picture (or slice) is P picture (slice), the motion vector prediction and motion vector for one of the prediction directions (reference picture list) among L0 and L1, and in the case in which the current picture (slice) is B picture (slice), the motion vector prediction and motion vector for both prediction directions L0 and L1 may be obtained.

Figure 8:
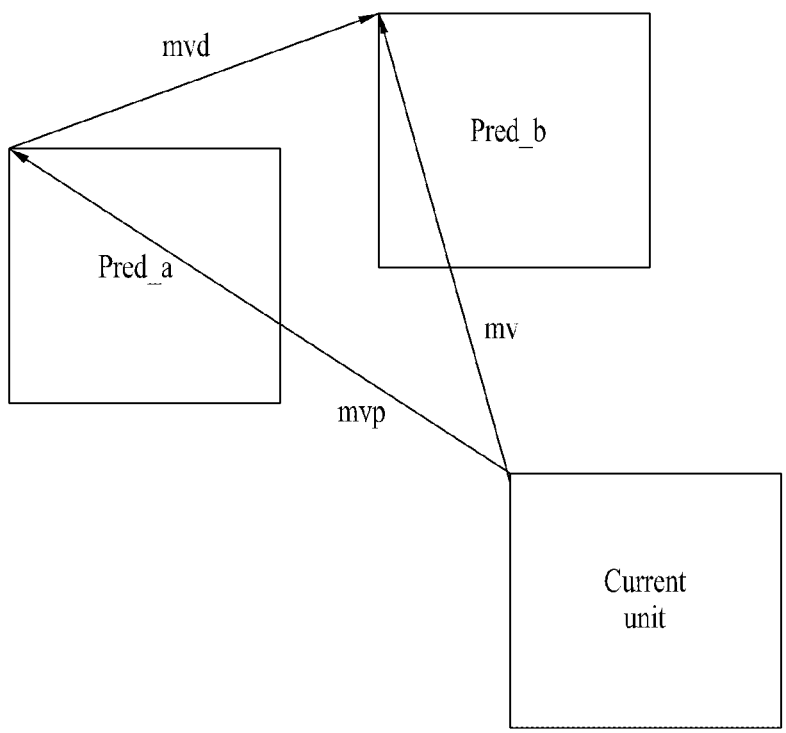
FIG. 8 illustrates a reference unit indicated respectively by a motion vector prediction value and motion vector of the current unit.

The reference unit for picture prediction of the current unit may be obtained using the motion vector prediction and motion vector of the obtained current unit. As illustrated in FIG. 8, if the reference unit, which has been obtained through the motion vector prediction (mvp) of the current unit, is called Pred_a, and the reference unit, which has been obtained through the motion vector (mv) by the sum of the motion vector prediction (mvp) and motion vector difference (mvd), is called Pred_b, the following reference unit candidates may be used for image prediction of the current unit.

a) Pred_a for L0 prediction, b) Pred_a for L1 prediction, c) Pred_a for bidirectional prediction, d) Pred_b for L0 prediction, e) Pred_b for L1 prediction, f) Pred_b for bidirectional prediction, g) Pred_a of a skip/direct mode.

Here, Pred_a may be obtained by calculating the average of Pred_a for L0 prediction and Pred_a for L1 prediction, and the Pred_b for the bidirectional prediction may be obtained by calculating the average of Pred_b for L0 prediction and Pred_b for L1 prediction. Further, when the current unit corresponds to P picture (or slice), Pred_a of skip/direct mode may use Pred_a for L0 or L1 prediction of the picture, and when the current unit corresponds to B picture, the average of Pred_a for L0 prediction and Pred_a for L1 prediction may be calculated. The skip mode or direct mode transmits only the flag for the mode without separately transmitting motion information, and thus the motion vector prediction direction of the current unit is not specified.

Here, in order to predict a more accurate image of the current unit, multi-hypothesis inter prediction may be performed using the reference unit candidates. In the present invention, multi-hypothesis inter prediction refers to predicting the image of the current unit by combining two or more reference units (predictors). In order to perform multi-hypothesis inter prediction, the decoder may be notified of the locations of several reference units directly, or the decoder should be able to perform inducement. Whether the multi-hypothesis inter prediction should be performed may be transmitted through a separate flag value, or may be set to be induced according to the number of units which may be referred to.

Here, in the present invention, in the above a) to g), the prediction value of the current unit may be obtained by combining two or more valid reference unit candidates, and image prediction may be performed using the obtained value. For example, the prediction value of the current unit may be obtained by combining Pred_a for L0 prediction and Pred_b for L0 prediction, and it is possible to combine Pred_b for L0 prediction and Pred_b for bidirectional prediction. At this time, the combination of the reference units may be obtained by calculating the average of pixel values of reference units, and calculating a sum by giving weight is also possible.

Further, a plurality of motion vectors may be used for the prediction direction of each of L0 and L1 by extending the reference unit candidate group for multi-hypothesis inter prediction. That is, a multiple of motion vector predictions and motion vectors may be obtained for each of the L0 and L1 prediction directions from neighbor units of the current unit, and the prediction unit of the current unit may be obtained by combining the reference units. At this time, in order to obtain a multiple of motion vector predictions and motion vectors for each of the L0 and L1 prediction directions, all valid motion vectors, which exist in spatial neighbor units and temporal neighbor units of the current unit, may be used as the motion vector predictions of the current unit. Further, a multiple of motion vectors may be obtained by adding up the multiple of motion vector predictions and each motion vector difference. Hence, if it is assumed that the reference unit, which is obtained through motion vector prediction (mvp) of the current unit, is called Pred_a, and the reference unit, which has been obtained through the motion vector (mv) by the sum of the motion vector prediction (mvp) and motion vector difference (mvd), is called Pred_b, the reference unit candidates for the image prediction of the current unit may be extended as follows.

a') Pred_a for one set of motion information of L0 prediction, b') Pred_a for $N_0$ sets of motion information of L0 prediction, c') Pred_b for one set of motion information of L0 prediction, d') Pred_b for $N_0$ sets of motion information of L0 prediction, e') Pred_a for one set of motion information of L1 prediction, f') Pred_a for $N_1$ sets of motion information of L1 prediction, g') Pred_b for one set of motion information of L1 prediction, h') Pred_b for $N_1$ sets of motion information of L1 prediction, i') a combination of a') to h')

Here, the combination of the reference unit included in the reference unit candidate group may be obtained by calculating the average of the pixel value of each reference unit as described above, and it is also possible to calculate the sum by giving weight.

According to another exemplary embodiment of the present invention, a motion vector scaling scheme may be used to obtain a multiple of reference units. The motion vector scaling refers to a scheme for proportional extension or proportional reduction of the motion vector according to the temporal distance between the reference frames and the current frame. When performing inter prediction, if the motion vector scaling scheme is used, each of the reference units may be obtained from different reference frames, and the multi-hypothesis inter prediction may be performed by the combination thereof. As such, the decoder may obtain several reference units using only one motion vector, and more accurate image prediction may be performed by the combination.

Figure 9:
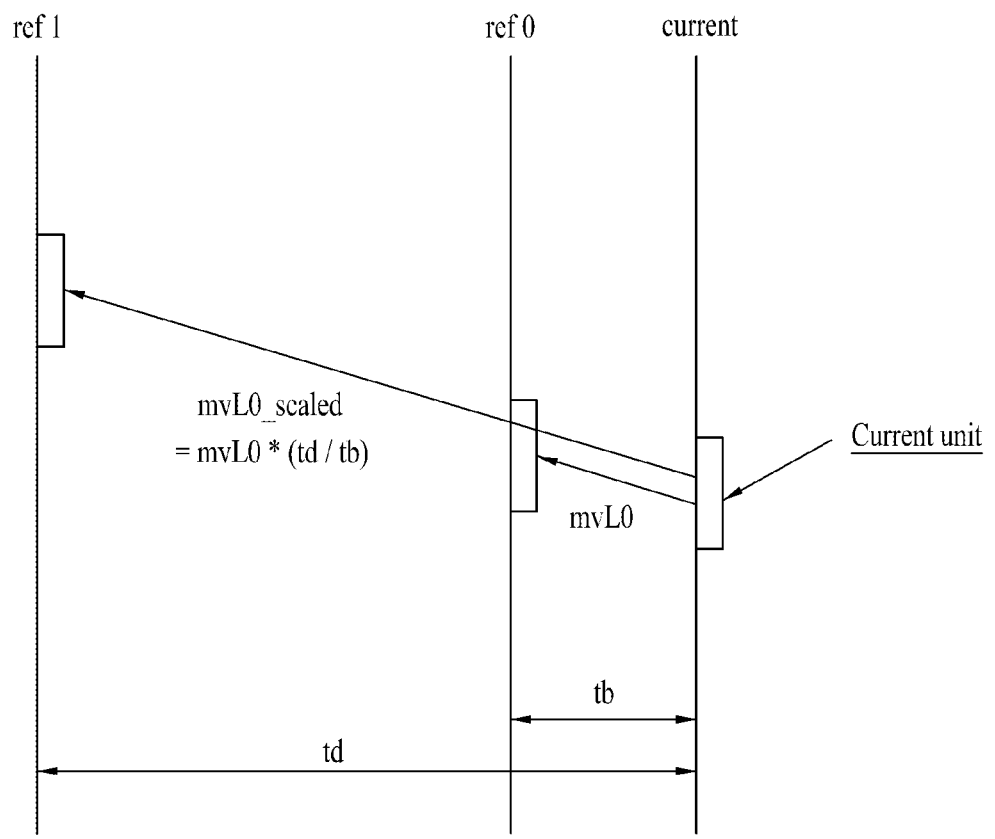
FIG. 9 illustrates a method for scaling a motion vector according to a temporal distance between frames.

FIG. 9 illustrates a method for scaling a motion vector according to a temporal distance between frames. When the motion vector in L0 direction of the current unit is mvL0 and the reference frame of the mvL0 is ref0, mvL0N_scaled, which is the result of scaling the mvL0 for ref1, another reference frame, may be shown as follows.

$$mvL0N\_scaled = mvL0*(td/tb)$$

Here, tb refers to a temporal distance between the current frame and ref0, and td refers to a temporal distance between the current frame and ref1. The temporal distance between frames may be calculated through the difference between picture order count (POC) values between frames.

Likewise, after the first reference unit is obtained in ref0 frame using motion vector mvL0 of the current unit, and the second reference unit is obtained from ref1 frame using scaled motion vector mvL0N_scaled of the current unit, the prediction value of the current unit may be obtained by combining the two reference units. In the present invention, the number of reference units, which are used in the multi-hypothesis inter prediction using the motion vector scaling, is not limited to 2. That is, in the case in which the number of reference frames stored in the decoded picture buffer (DPB) is two or more, the number of available reference units may be increased by scaling the motion vector for each frame stored in the DPB.

In the case in which the prediction value of the current unit is obtained using a multiple of reference units, some examples of methods for combining each reference unit are 1) a method of calculating an average for an image value of each reference unit, ii) a method of performing linear combination by weighting the image value of each reference unit in inverse proportion to the temporal distance between each reference unit and the current frame, iii) a method of performing linear combination by weighting the image value of each reference unit in inverse proportion to a square of the temporal distance between each reference unit and the current frame, etc.

Figure 10:
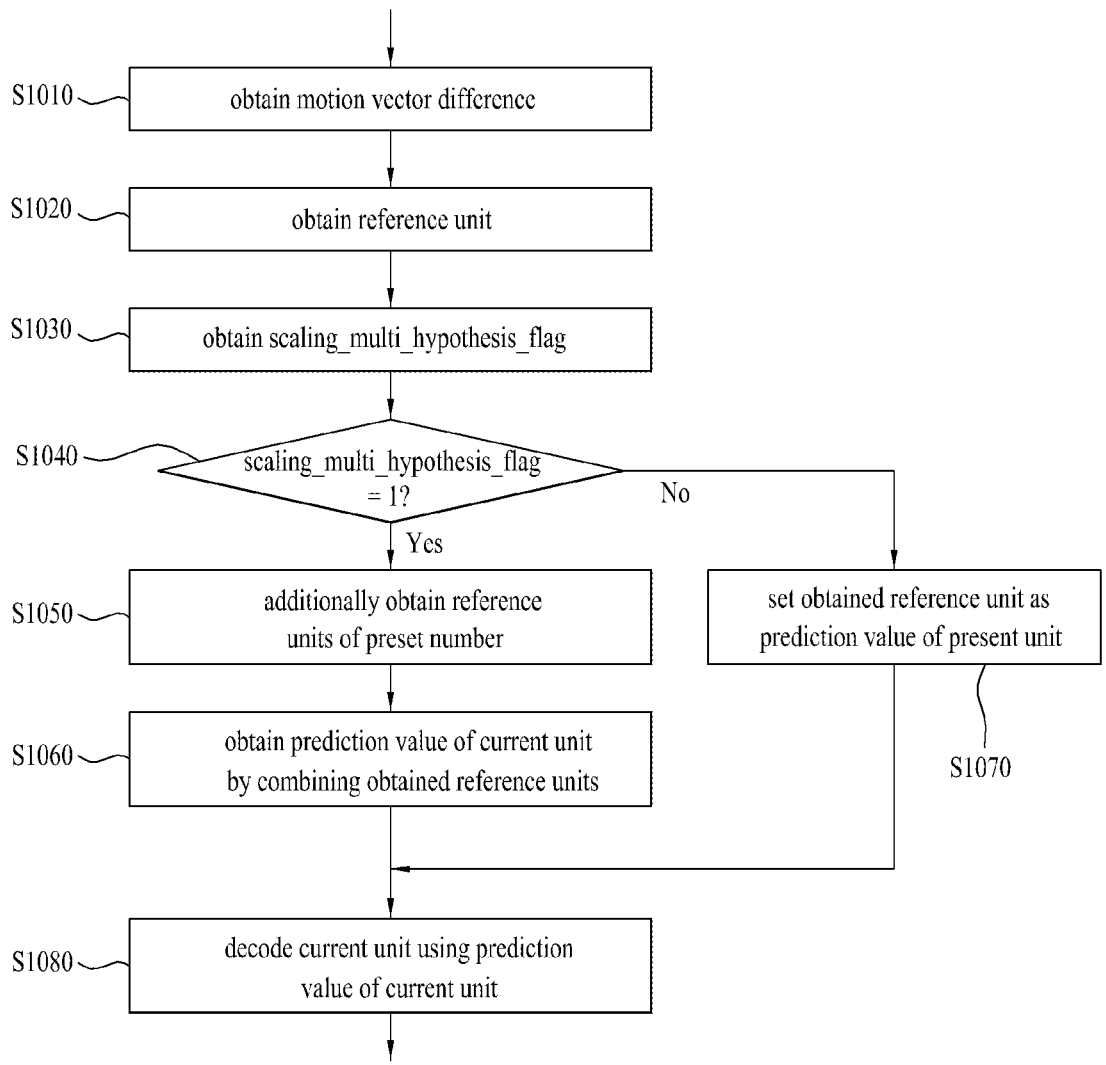
FIGS. 10 to 12 are flowcharts illustrating a process of obtaining a prediction value of the current unit by combining a multiple of reference units according to an exemplary embodiment of the present invention.

Further, according to an exemplary embodiment of the present invention, multi-hypothesis inter prediction using the motion vector scaling may use reference units of a fixed number, and may also use reference units of a variable number. FIG. 10 illustrates an example of performing multi-hypothesis inter prediction using reference units of a fixed number.

Referring to FIG. 10, in the case in which reference units of a fixed number are used, as in the conventional inter prediction method, the motion vector difference is transmitted by coding the motion vector of the current unit, and the flag (scaling_multi_hypothesys_flag), which gives information on whether the multi-hypothesis inter prediction will be performed using motion vector scaling, may be additionally transmitted.

In the decoder, the motion vector of the current unit is calculated by obtaining the transmitted motion vector difference (S1010), and the reference unit, which is indicated by the motion vector, is obtained (S1020). Next, by obtaining the transmitted flag (scaling_multi_hypothesys_flag) (S1030), in the case in which the flag is 0, the reference unit, which is obtained in step S1020, is set to the prediction value of the current unit (S1070) as in a general inter prediction, and decoding of the current unit is performed (S1080). If the flag (scaling_multi_hypothesys_flag) is 1, the reference units are additionally obtained according to a preset number (S1050). Here, the added reference unit may be obtained from other frames by scaling the motion vector of the current unit according to an exemplary embodiment of the present invention. The decoder obtains the prediction value of the current unit by combining a multiple of reference units including the added reference unit (S1060), and the decoding of the current unit may be performed using the obtained prediction value (S1080).

Figure 11:
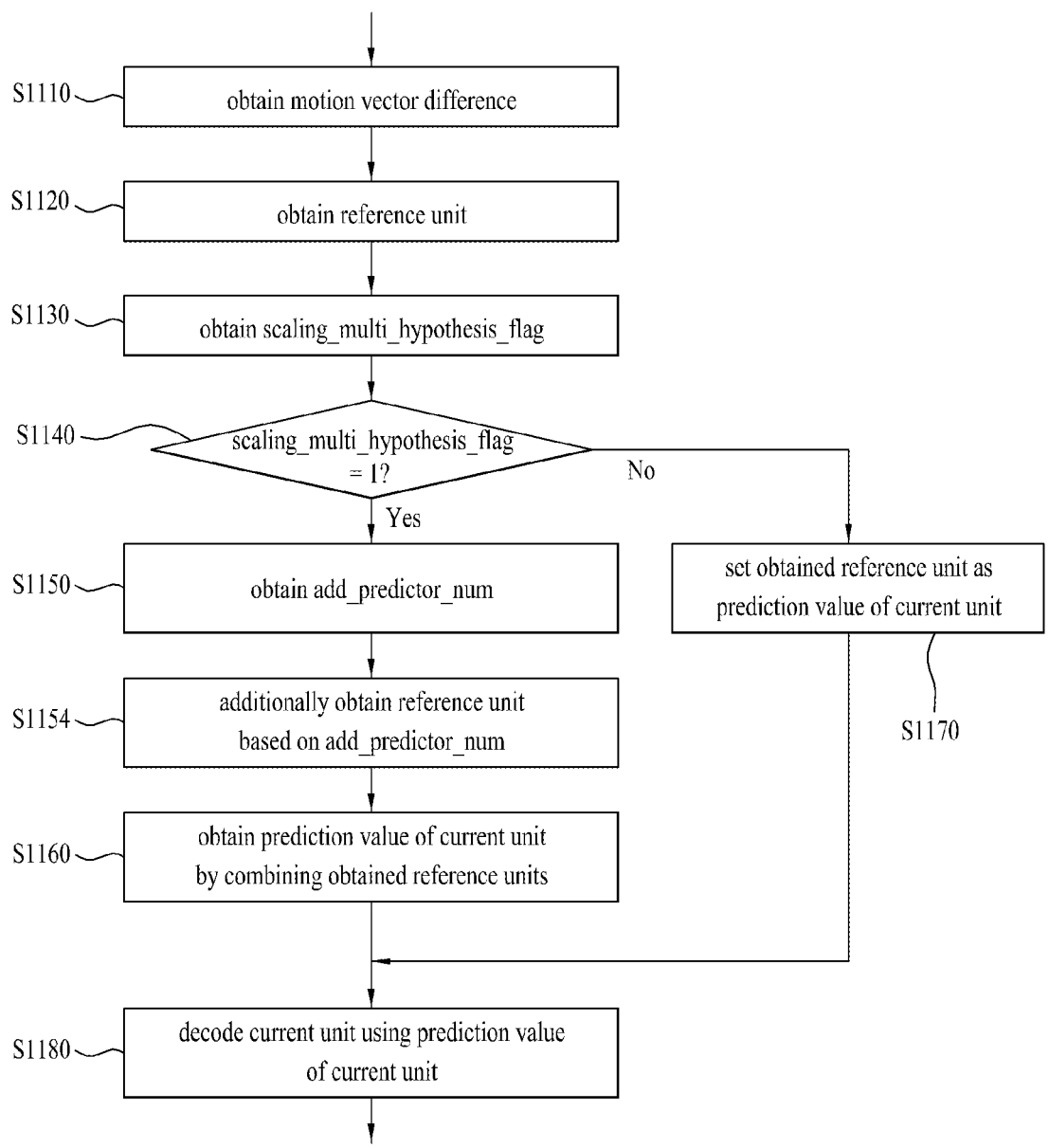

Further, according to an exemplary embodiment of the present invention, multi-hypothesis inter prediction may be performed using reference units of a variable number, and FIGS. and 12 illustrate an embodiment thereof. When describing embodiments of FIGS. 11 and 12, redundant descriptions, which have already been described with reference to FIG. 10, will be omitted.

First, according to an exemplary embodiment of the present invention, a method of separately transmitting the number of reference units used to obtain the prediction value of the current unit may be used. That is, in the case in which the transmitted flag (scaling_multi_hypothesys_flag) value is 1, the variable (add_predictor_num), which provides information on the number of reference units added, may be additionally transmitted.

In the decoder, in the case in which the obtained flag (scaling_multi_hypothesys_flag) is 1, the transmitted variable (add_predictor_num) is obtained (S1150), and the reference unit is additionally obtained on the basis of the value of the variable (add_predictor_num) (S1154). Here, the added reference unit may be obtained from different frames by scaling the motion vector of the current unit according to an exemplary embodiment of the present invention. The decoder may obtain the prediction value of the current unit by combining a multiple of reference units including the added reference unit (S1160), and decoding of the current unit may be performed using the obtained prediction value (S1180).

Figure 12:
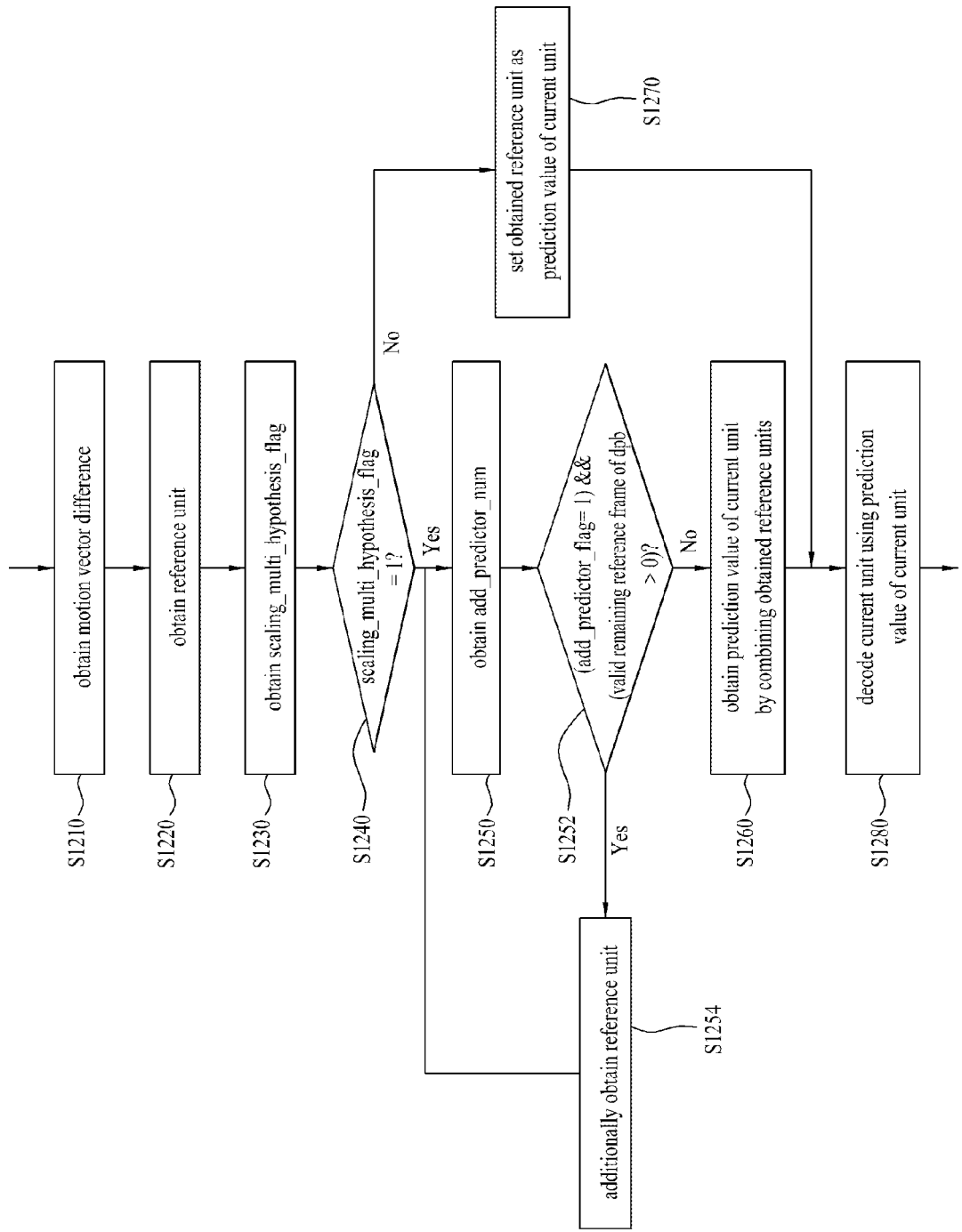

Further, referring to FIG. 12, in the case in which the transmitted flag (scaling_multi_hypothesys_flag) value is 1, the method of repeatedly transmitting the flag (add_predictor_flag), which gives information on whether the reference unit will be added, may be used.

In the decoder, in the case in which the obtained flag (scaling_multi_hypothesys_flag) is 1, when the flag (add_predictor_flag), which indicates whether the reference unit will be added, is 1, and the number of the valid remaining reference frames of the DPB is 1 or more, the reference unit is additionally obtained (S1254). The process of adding the reference unit is repeated until the flag (add_predictor_flag) is 0 or the reference unit may not be added any more (for example, when a valid reference frame, which may add the reference unit in the prediction direction, does not exist anymore in the DPB). Through the above process, the prediction value of the current unit may be obtained by combing the obtained reference units (S1260), and decoding of the current unit may be performed using the obtained prediction value (S1280).

In the exemplary embodiment of the present invention, the frames, which are selected for addition of the reference unit among frames stored in the DPB, may be determined according to various priorities. For example, i) selection may be made in an increasing order from the lowest reference index value, ii) selection may be made in a distance-increasing order from the reference index value closest to the reference index value of the actually transmitted current unit, or iii) selection may be made in a distance-increasing order from the reference index value temporally closest to the reference frame indicated by the reference index of the actually transmitted current unit.

Further, such a method of adding a reference unit using the motion vector scaling may be used by combining the method with a method of combining the motion vector prediction and motion vector for L0 and L1 prediction directions. That is, various reference units may be obtained through the motion vector scaling for each motion vector prediction and motion vectors for L0 and L1 prediction directions, and the image prediction of the current unit may be performed by combining the obtained reference units.

Further, the prediction information (e.g., a reference index, motion vector, prediction direction, etc.), which is necessary for inter prediction of the current unit, is not directly included in the bitstream to be transmitted, but may be induced using the neighbor unit. Using such a method, the number of bits allocated to the prediction information may be reduced, thereby increasing the compression rate. Specifically, the prediction information of the coded neighbor unit may be utilized as the prediction information of the current unit using inter prediction. When such a method is used, it is described that the current unit has been merged with the neighbor unit which has brought the prediction information, and such prediction method is called a merge mode.

For the merge mode, the bitstream may include information indicating whether the current unit has been merged (e.g., a flag like merge_flag) and merge information indicating which neighbor unit the current unit has been merged with (e.g., a flag indicating whether the current unit has been merged with a specific unit, or index information indicating a specific neighbor, etc.). The information, which indicates which neighbor unit the current unit has been merged with, may be set to be obtained only in the case in which it is indicated that the current unit has been merged (in this example, when merge_flag is TRUE or 1).

Figure 13:
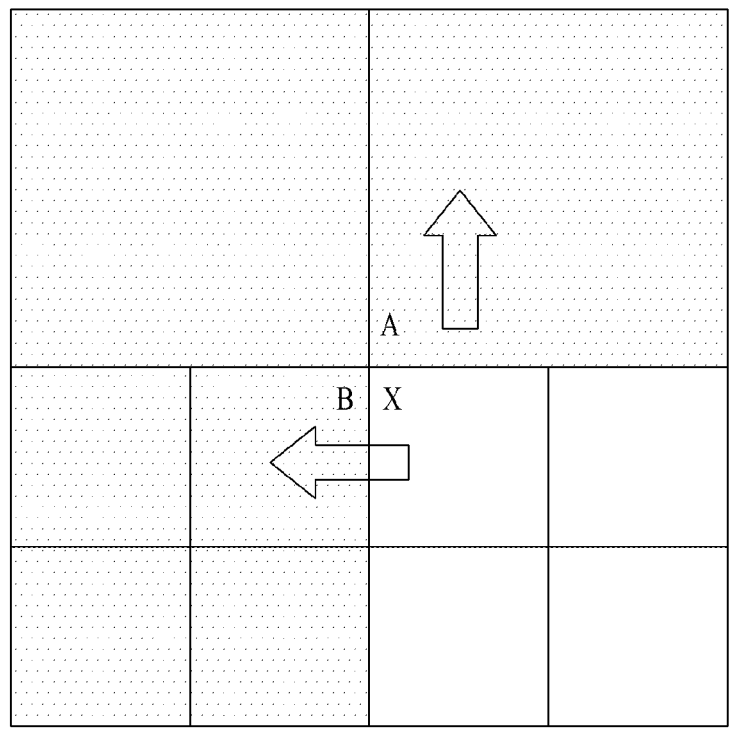
FIG. 13 illustrates an embodiment of a neighbor unit which may be merged with the current unit.

For example, referring to FIGS. 13 and 14, in the merge mode, the current unit (x) may be merged with the upper neighbor unit (A) or left neighbor unit (B). Here, if there is a unit (a unit at an inter mode), which is valid for merger, among the upper neighbor unit and the left neighbor unit, the merge _flag 1402, which indicates whether the current unit will be merged, may be obtained. If the merge_flag is 0, general inter prediction may be performed, and if the merge_flag is 1, a merge mode may be performed. Here, if the merge_flag is 1 and the number (NumMergeCandidates) of neighbor units, which are valid for merger, is greater than 1, the merge_left_flag 1404, which indicates which neighbor unit the current is merged with, may be obtained. The merge_left_flag includes information on the direction of the neighbor unit, with which the current unit will be merged, on the basis of the current unit. Here, the current unit obtains the reference unit using the motion information of the neighbor unit, in which merger is performed, and the image prediction is performed using the obtained reference unit.

Figure 15:
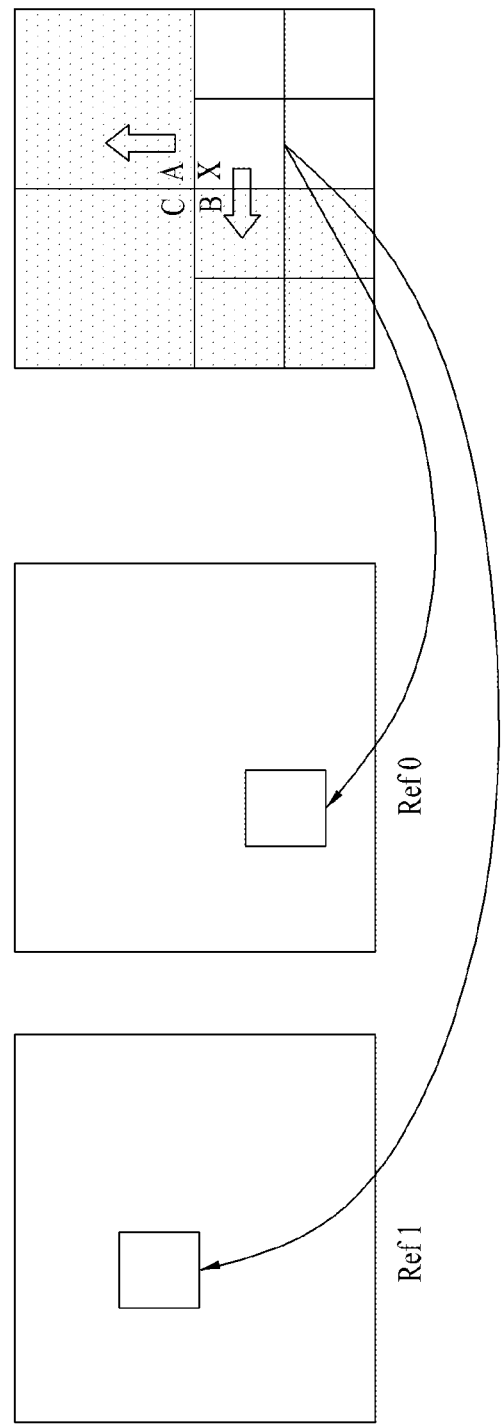
FIG. 15 illustrates reference units which may be used in multiple-prediction merger of the current unit.

According to an exemplary embodiment of the present invention, in such a merge mode, each reference unit is obtained using motion information of the two or more neighbor units to be merged, and a multi-hypothesis merging, which uses a combination of the obtained reference units as a prediction value of the current unit, may be performed. That is, in FIG. 15, in the case in which both unit A and unit B, which are to-be-merged neighbor units of the current unit (X), are valid (at an inter mode), the reference unit may be obtained in ref 0 frame and ref 1 frame by applying the motion information of each neighbor unit to the current unit, and the image prediction of the current unit may be performed by combining the obtained reference units.

At this time, the neighbor units to be merged may be variously changed. That is, in the case in which the neighbor unit (c) in the upper left corner of the current unit is valid in FIG. 15, unit C may also be used in merger. Further, in the case in which the neighbor unit in the upper right corner of the current unit and the neighbor unit in the bottom left corner of the current unit are also valid, they may also be included in the merging candidates.

Likewise, when multi-hypothesis merger is performed using the motion information of a multiple of neighbor units, the merge_mode, which is an index value indicating the combination of neighbor units to be used in the merger, may be transmitted so as to be obtained. That is, as illustrated in FIG. 16, in the case in which merge_flag is 1 and the number (NumMergeCandidates) of the neighbor units, which are valid for merger, is greater than 1, the merge_mode 1604, which is the index value, may be obtained, and multi-hypothesis merging may be performed by combining neighbor units selected according to the merge_mode value.

Unlike merge_left_flag, which selects one neighbor unit to perform merger with the current unit, the merge_mode notifies which combination of neighbor units will be used for merger. For example, as in FIG. 15, in the case in which only the upper neighbor unit and left neighbor unit of the current unit are used as the merging candidates, if the merge_mode is 0, merger may be performed with the upper neighbor unit (A), if the merge_mode is 1, merger may be performed with the left neighbor unit (B), and if the merge_mode is 2, merger may be performed with the two neighbor units (A, B). A merge candidate list may include neighbor units which may be merged with the current unit. Here, the neighbor units may include at least one of a spatial neighbor unit and a temporal neighbor unit. In this case, the current unit may perform a merger with a specified neighbor unit according to merge_mode index. Further, two of the neighbor units included in the merge candidate list may be combined and the combined unit is added to the merge candidate list, and thereby the combined unit may be used as a merge candidate for the current unit. For example, motion information for L0 prediction may be extracted from one of two neighbor units and motion information for L1 prediction may be extracted from the other of the neighbor units, and motion information for bi-prediction may be derived by combining such motion information sets. The derived motion information for bi-prediction may be allocated to a merge candidate generated by combination of two neighbor units. However, combination of neighbor units may be limited to be performed under the following conditions. For example, the above combination may be performed when a reference picture corresponding to a reference index for L0 prediction of one of two neighbor units is different from a reference picture corresponding to a reference index for L1 prediction of the other of the two neighbor units. This may mean a case in which picture order counts (POC), which are allocated to the reference pictures of the neighbor units, are different from each other. Or, such a combination may be performed when a motion vector for L0 prediction of one of two neighbor units is different from a motion vector for L1 prediction of the other of the neighbor units. Of course, in the case in which the neighbor units, which are merging candidates of the merging mode, are different from the above, the merge_mode may be differently defined.

In the case in which a multi-hypothesis combination is performed according to an exemplary embodiment of the present invention, various methods for performing merger using two or more neighbor units may be suggested. For example, if it is assumed that motion vectors of neighbor units A and B are mvA and mvB, respectively, and the reference units are predA and predB, respectively, unit prediction of the current unit X may be calculated as follows.

i) A method of calculating an average of the image values of reference units

Figure 17:
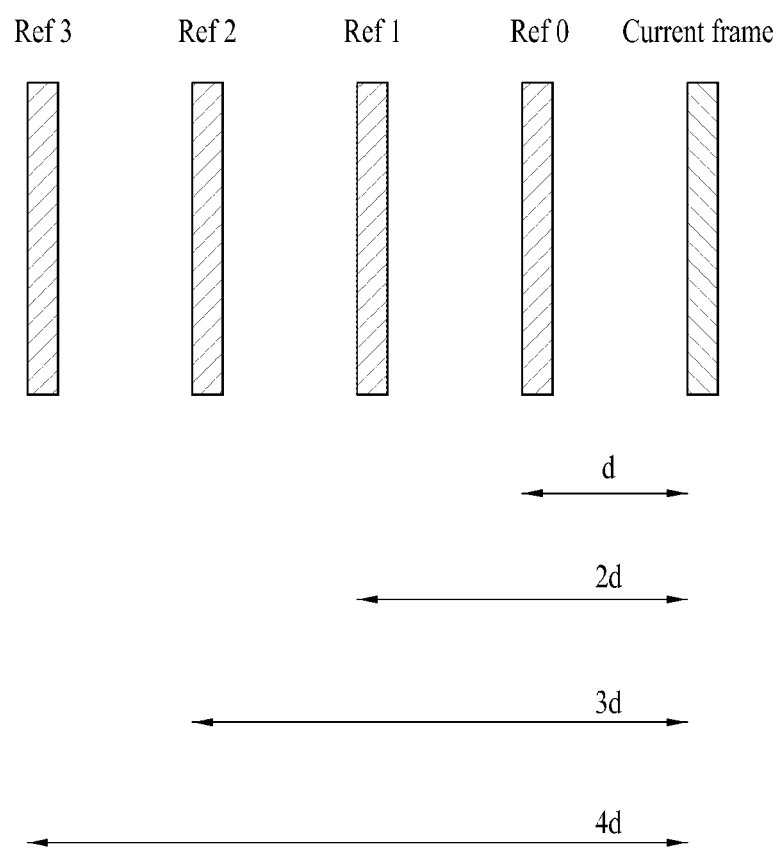
FIG. 17 schematically illustrates a temporal distance between the current frame and a reference frame.

That is, $predX=(predA+predB+1)>>1$ ii) A method of obtaining mvA' and mvB' by scaling motion vectors mvA and mvB of each reference unit, and calculating the image value of new reference units predA' and predB' obtained through the scaled motion vector.

iii) Method of performing linear combination by weighting the image value of each reference unit in inverse proportion to the temporal distance between each reference unit and the current frame. That is, when the reference frame of mvA is ref 0 and the reference frame of mvB is ref 1 in FIG. 17, the temporal distance between the reference frame (ref 0) of the neighbor unit A and the current frame is "d", and the temporal distance between the reference unit (ref 1) of the neighbor unit B and the current frame is "2d". Hence, the prediction value predX of the current unit X may be calculated as shown below by giving weight in consideration of such a temporal distance.

$$predX=(2*predA+predB)/3$$

Figure 18:
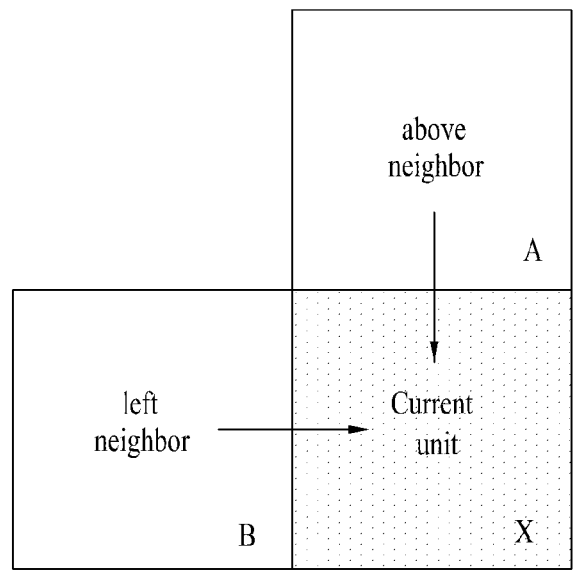
FIG. 18 illustrates a current unit in which multiple-prediction merger is performed using motion information of different neighbor units.

Further, in the case in which the current unit is decoded in a merge mode, the motion information on the current unit for the decoding of the next unit should be stored. As illustrated in FIG. 18, the current unit X, which has performed a multi-hypothesis merger, uses motion information (motion_info(A) and motion_info(B)) of two or more neighbor units (A, B) to perform the merger. Here, the motion information (motion_info(A) and motion_info (B)) of each unit may have different values, and if all the motion information sets of different neighbor units are stored, as the multi-hypothesis merger is performed, the motion information sets, which should be stored, will rapidly increase. Hence, in order to store the motion information of the current unit, which has performed the multi-hypothesis merger, the following method may be used.

a) Storing information in an optimal mode from the perspective of the rate distortion (RD) among conventional inter prediction coding methods.

b) Storing average values of two or more valid neighbor unit motion information sets to be merged (here, when the number is not an integer, a rounded-up, rounded-down or rounded-off value may be used).

c) Storing the smallest value among two or more valid neighbor unit motion information sets to be merged.

d) The most frequent value among motion information sets of neighbor units having an inter mode.

e) Median of the motion information of the neighbor units.

f) According to the image attributes, methods of a) to e) are selectively combined.

Figure 19:
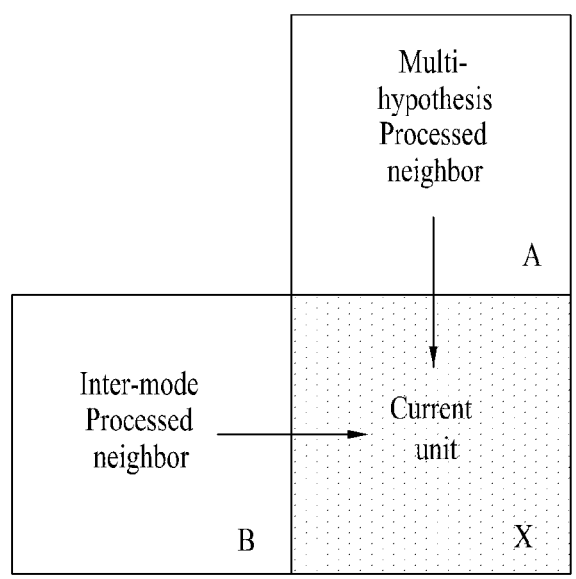
FIG. 19 illustrates a current unit having a unit having performed multiple-prediction merger as a neighbor unit.

Further, as illustrated in FIG. 19, in the case in which the neighbor unit A of the current unit X is a unit which has performed a multi-hypothesis merger, in order to process motion information of the current unit X, the motion information of the neighbor unit A should be referred to, and thus there is a need for a method for processing motion information of the neighbor unit. Hence, in order to refer to motion information of neighbor units, which have performed a multi-hypothesis merger, the following methods may be used.

a') Referring to motion information stored according to the methods of a) to f), which have been suggested to store motion information of the unit which has performed a multi-hypothesis merger.

b') The unit, which has performed the multi-hypothesis merger, is considered as an invalid unit (e.g., processed as an intra mode).

c') Referring to motion information of other neighbor units of the neighbor unit which has performed the multi-hypothesis merger.

d') By checking the continuity of the multi-hypothesis merger application, motion information is differently referred to according to whether the threshold is exceeded.

e') the methods of a') to d') are selectively combined according to the image attributes.

Likewise, according to an exemplary embodiment of the present invention, if a multi-hypothesis inter prediction or a multi-hypothesis merger is performed, a more accurate unit prediction may be obtained, and the bit rate, which is transmitted for restoration of the image, may be reduced.

Exemplary embodiments described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

A decoding/encoding method, to which the present invention is applied, is configured with a program for computer execution and then stored in a computer-readable recording medium. And, multimedia data having a data structure of the present invention can be stored in computer-readable recording medium. The computer-readable recording media include all kinds of storage devices for storing data that can be read by a computer system. The computer-readable recording media include ROM, RAM, CD-ROM, magnetic tapes, floppy discs, optical data storage devices, etc. and also includes a device implemented with carrier waves (e.g., transmission via internet). And, a bit stream generated by the encoding method is stored in a computer-readable recording medium or transmitted via wire/wireless communication network.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by controller.

For a software implementation, the embodiments described herein may be implemented with separate software modules, such as procedures and functions, each of which perform one or more of the functions and operations described herein. The software codes can be implemented with a software application written in any suitable programming language and may be stored in memory, and executed by a controller.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention may be applicable to encoding or decoding a video signal.

The invention claimed is:

1. A method of decoding a video signal by a decoding apparatus, the method comprising:
    obtaining, by the decoding apparatus from the video signal, merge flag information, the merge flag information indicating whether inter prediction information of a current block is derived from a neighboring block adjacent to the current block, the inter prediction information including at least one of reference index information and motion vector information;
    constructing, by the decoding apparatus, a merging candidate list based on the merge flag information, the merging candidate list including a plurality of merging candidates, the merging candidates including neighboring blocks adjacent to the current block;
    obtaining, by the decoding apparatus, first inter prediction information associated with a first reference picture list from a first neighboring block in the constructed merging candidate list;
    obtaining, by the decoding apparatus, second inter prediction information associated with a second reference picture list from a second neighboring block in the constructed merging candidate list, the second neighboring block being different from the first neighboring block;
    deriving, by the decoding apparatus, a combined merging candidate having inter prediction information for bi-prediction by combining the obtained first inter prediction information and the obtained second inter prediction information, when the obtained first inter prediction information is different from the obtained second inter prediction information;
    adding, by the decoding apparatus, the derived combined merging candidate to the constructed merging candidate list;
    obtaining, by the decoding apparatus from the video signal, merge index information of the current block;
    obtaining, by the decoding apparatus, the inter prediction information of the current block based on the merging candidate list and the merge index information; and
    predicting, by the decoding apparatus, the current block using the obtained inter prediction information of the current block.

2. The method of claim 1, wherein the neighboring blocks include at least one of a top neighboring block, a left neighboring block, a top-right neighboring block, and a bottom-left neighboring block of the current block.

3. The method of claim 1, wherein the first reference picture list corresponds to a reference picture list 0, and the second reference picture list corresponds to a reference picture list 1.

4. The method of claim 1, wherein the first inter prediction information being different from the second inter prediction information includes:
    reference index information of the first inter prediction information being different from reference index information of the second inter prediction information.

5. The method of claim 1, wherein the first inter prediction information being different from the second inter prediction information includes:
    motion vector information of the first inter prediction information being different from motion vector information of the second inter prediction information.

6. The method of claim 1, wherein the combined merging candidate has reference index information of the first inter prediction information in association with the first reference picture list and reference index information of the second inter prediction information in association with the second reference picture list.

7. The method of claim 1, wherein the combined merging candidate has motion vector information of the first inter prediction information in association with a reference picture of the first reference picture list and motion vector information of the second inter prediction information in association with a reference picture of the second reference picture list.

8. The method of claim 1, wherein obtaining the inter prediction information of the current block comprises:
    selecting a merging candidate corresponding to the obtained merge index information from the merging candidate list, and
    deriving the inter prediction information of the current block from the selected merging candidate.

9. The method of claim 1, wherein the merge index information specifies one of the merging candidates or the combined merging candidate in the merging candidate list.

10. An apparatus configured to decode a video signal, the apparatus comprising:
    a decoding apparatus configured to:
    obtain merge flag information from the video signal, the merge flag information indicating whether inter prediction information of a current block is derived from a neighboring block adjacent to the current block, the inter prediction information including at least one of reference index information and motion vector information,
    construct a merging candidate list based on the merge flag information, the merging candidate list including a plurality of merging candidates, the merging candidates including neighboring blocks adjacent to the current block,
    obtain first inter prediction information associated with a first reference picture list from a first neighboring block in the constructed merging candidate list, obtain second inter prediction information associated with a second reference picture list from a second neighboring block in the constructed merging candidate list, the second neighboring block being different from the first neighboring block, derive a combined merging candidate having inter prediction information for bi-prediction by combining the obtained first inter prediction information and the obtained second inter prediction information, when the obtained first inter prediction information is different from the obtained second inter prediction information, add the derived combined merging candidate to the constructed merging candidate list, obtain, from the video signal, merge index information of the current block, the merge index information specifying one of the merging candidates or the combined merging candidate in the merging candidate list, obtain the inter prediction information of the current block based on the merging candidate list and the merge index information, and predict the current block using the obtained inter prediction information of the current block.

11. The apparatus of claim 10, wherein the neighboring blocks include at least one of a top neighboring block, a left neighboring block, a top-right neighboring block, and a bottom-left neighboring block of the current block.

12. The apparatus of claim 10, wherein the first reference picture list corresponds to a reference picture list 0, and the second reference picture list corresponds to a reference picture list 1.

13. The apparatus of claim 10, wherein the first inter prediction information being different from the second inter prediction information includes:

reference index information of the first inter prediction information being different from reference index information of the second inter prediction information.

14. The apparatus of claim 10, wherein the first inter prediction information being different from the second inter prediction information includes:

motion vector information of the first inter prediction information being different from motion vector information of the second inter prediction information.

15. The apparatus of claim 10, wherein the combined merging candidate has reference index information of the first inter prediction information in association with the first reference picture list and reference index information of the second inter prediction information in association with the second reference picture list.

16. The apparatus of claim 10, wherein the combined merging candidate has motion vector information of the first inter prediction information in association with a reference picture of the first reference picture list and motion vector information of the second inter prediction information in association with a reference picture of the second reference picture list.

17. The apparatus of claim 10, wherein obtaining the inter prediction information of the current block comprises:

selecting a merging candidate corresponding to the obtained merge index information from the merging candidate list, and deriving the inter prediction information of the current block from the selected merging candidate.

18. The apparatus of claim 10, wherein the merge index information specifies one of the merging candidates or the combined merging candidate in the merging candidate list.

* * * * *